Jan. 11, 1938. G. LINDSEY 2,104,879
REFRIGERATING DEVICE
Filed April 16, 1936 2 Sheets-Sheet 2
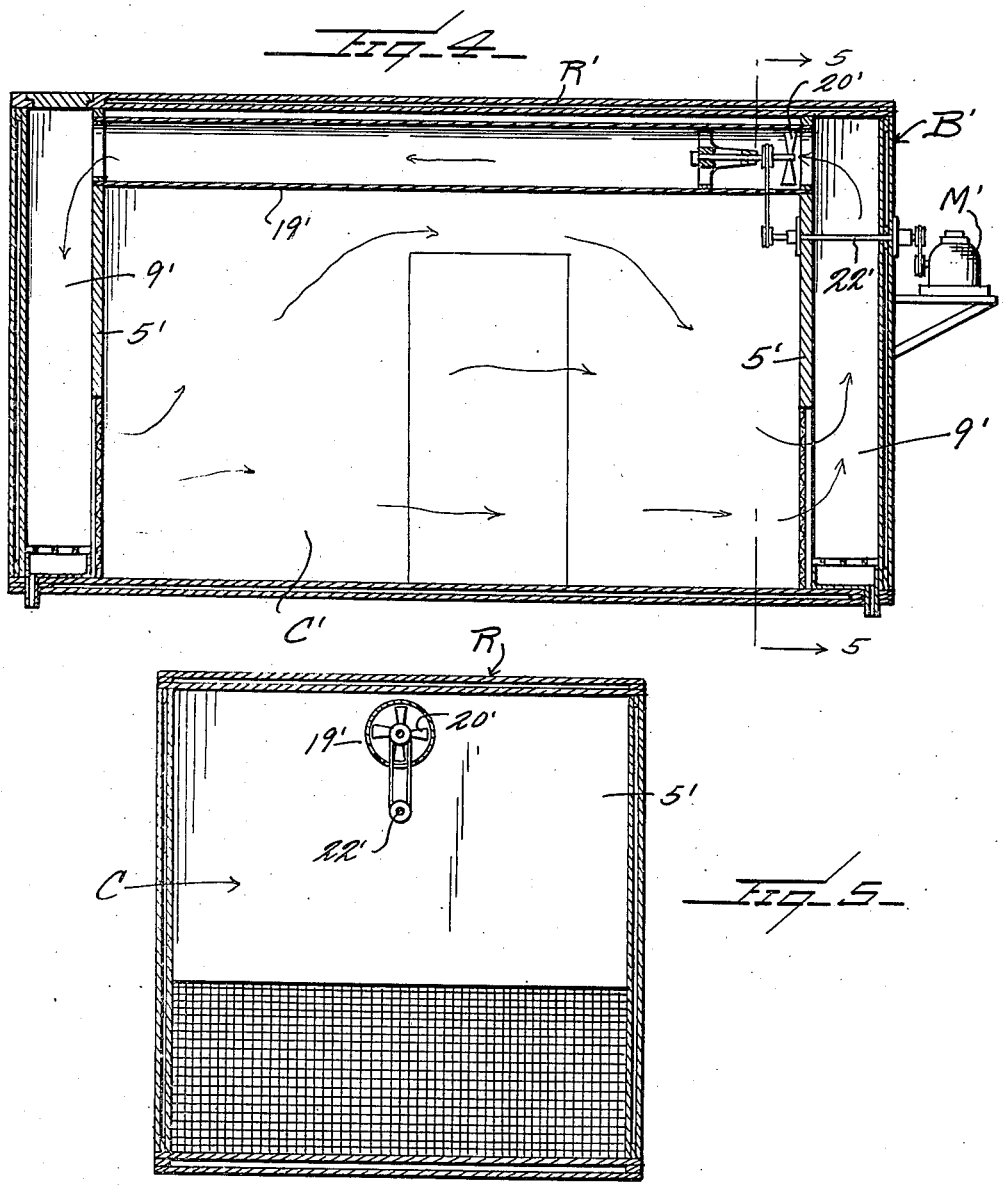
Inventor
G. Lindsey
By Watson E. Coleman
Attorney Patented Jan. 11, 1938

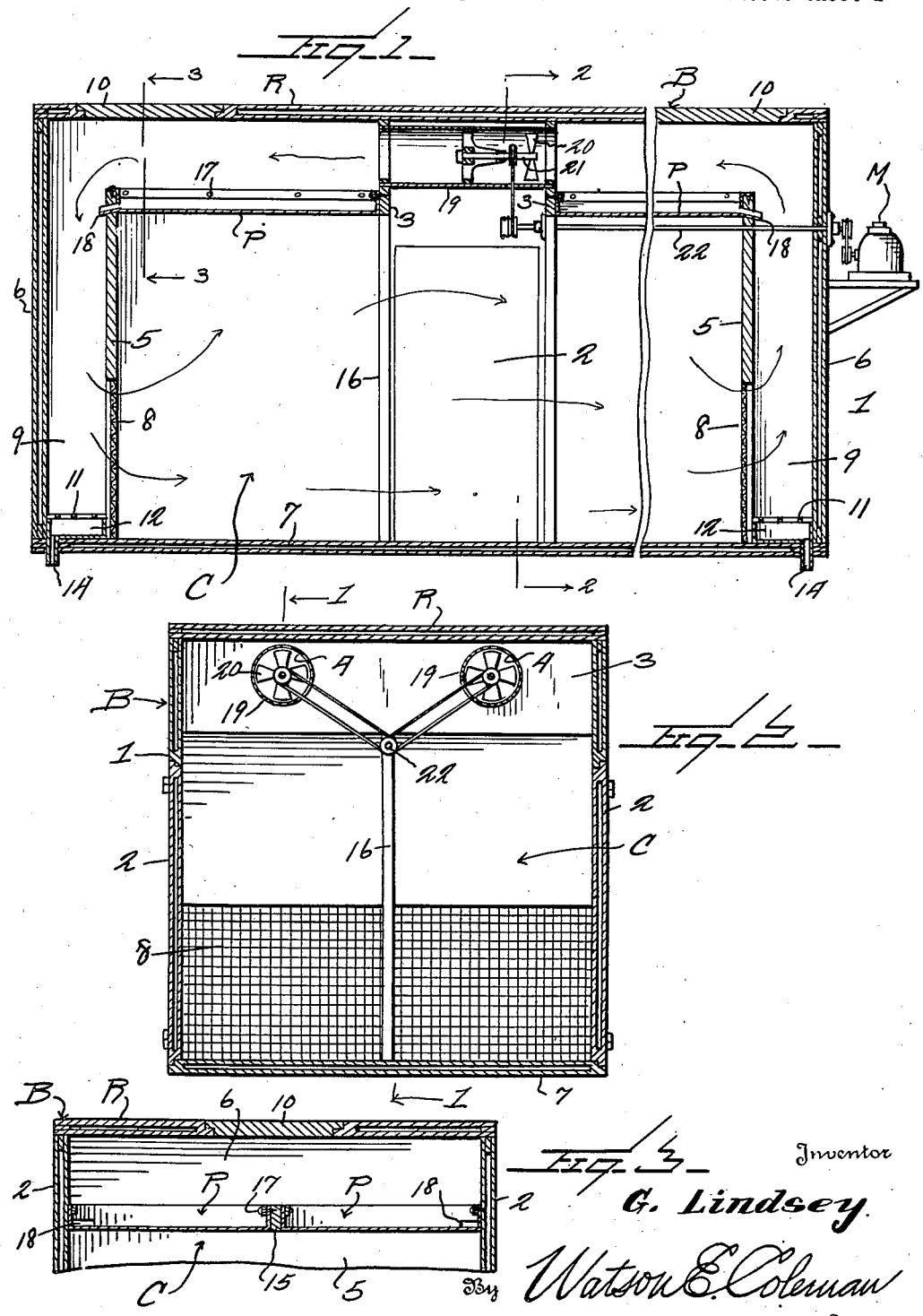

2,104,879

UNITED STATES PATENT OFFICE 2,104,879

REFRIGERATING DEVICE

Guy Lindsey, Hawthorne, Fla.

Application April 16, 1936, Serial No. 74,734

6 Claims. (Cl. 62—24)

This invention relates to refrigeration, and it is an object of the invention to provide a normally closed chamber having arranged therein means for creating a forced circulation of air and wherein means are provided for cooling such air after leaving the materials within the chamber to be cooled and before such air is returned to such materials.

The invention also has for an object to provide a means for refrigeration comprising a closed chamber together with means within said chamber to effect a rapid lowering of the temperature within the chamber and wherein a driven medium is provided for effecting and maintaining an air circulation within the closed chamber.

A still further object of the invention is to provide a closed chamber with ice bunkers at the ends together with means for supporting ice across the upper portion of the chamber with further means of effecting a circulation of air over the ice in the upper portion of the chamber and through the ice in the bunkers, the ice in the upper portion of the chamber also providing means for offsetting the heat of the sun which might be transmitted through the top of the chamber.

The invention also has for a further object means for rapidly lowering the temperature within the closed body of a vehicle and for maintaining such lowered temperature both while the vehicle is in transit or at a standstill, thus making the vehicle of particular value in the transporting of berries, vegetables and other perishable foodstuffs.

The novel features of my invention will hereinafter be definitely claimed.

In order that my invention may be the better understood, I will now proceed to describe the same with reference to the accompanying drawings, wherein:—

Figure 1 is a vertical sectional view taken through a refrigerating apparatus constructed in accordance with an embodiment of my invention, the section being substantially on the line 1—1 of Figure 2;

Figure 2 is a transverse sectional view taken substantially on the line 2—2 of Figure 1;

Figure 3 is a fragmentary detailed sectional view taken substantially on the line 3—3 of Figure 1;

Figure 4 is a vertical sectional view illustrating a refrigerating apparatus arranged in accordance with a further embodiment of my invention;

Figure 5 is a detailed sectional view taken substantially on the line 5—5 of Figure 4.

As disclosed in Figures 1, 2, and 3 of the accompanying drawings, B denotes a body of desired dimensions and which is adapted to be comprised in a trailer structure or mounted upon the chassis of a truck, said body being primarily for the purpose of transporting berries, vegetables and other perishable foodstuffs.

The body B provides a normally closed chamber C, the walls of which preferably being insulated and a side wall 1 is provided with a door 2 to permit access within the chamber C. As herein disclosed, each of the side walls 1 is provided with a door 2 although if preferred only one of such walls may be so equipped.

The central portion of the body B has depending from the roof R thereof two spaced partitions 3 extending entirely across the chamber C and imperforate except for a pair of openings 4, there being one opening 4 at each side of the transverse center of the chamber C. The partitions 3 extend a predetermined distance below the roof R and, as herein disclosed, a slight distance below the upper edges of the partitions 5 extending transversely across the chamber C in relatively close proximity to the end walls 6 thereof. These partitions 5 are imperforate with their upper edges spaced a material distance from the roof R and with the lower margins of the partitions 5 spaced a considerable distance from the bottom 7 of the chamber.

Interposed between the lower margins of the partitions 5 and the bottom 7 of the chamber C are the panels 8 of screen mesh or other structure having suitable openings for the passage of air therethrough. The partitions 5 and panels 8 coact with the end walls 6 of the body B to provide bunkers 9 for ice, the roof R of the body B being provided with suitably positioned trap doors 10 to allow for the ready and convenient placing of the ice within said bunkers. Each of the bunkers 9 closely adjacent to the bottom 7 of the body B is provided with a grid or rack 11 upon which the ice within the bunker 9 is directly supported and in communication with the chamber 12 below said grid or rack 11 is a discharge vent 14 for draining off the water resulting from the melting of the ice.

Suitably secured to the central portion of each of the partitions 5 immediately adjacent the top edge thereof is an end portion of a beam 15 which extends over to and is secured to the lower marginal portion of the adjacent central partition 3. I also find it of advantage to interpose between the central portion of each of the partitions 3 and the floor 7 a supporting prop 16.

Arranged at opposite sides of the strip 15 are the pans P, each of which being shallow. Each of these pans P snugly engages between the strip 15 and a side wall 1 and also between the upper marginal portion of a partition 5 and the lower marginal portion of a partition 3. Each of these pans is detachably held in place by removable screws 17 or the like so that when desired such pans P may be removed. A corner portion of each of the pans P is provided, as at 18, with a draining spout which is inserted through the adjacent upper portion of a partition 5 when the pan is in applied position. This draining spout 18 provides means whereby the water resulting from the melting of the ice within a pan P will be discharged into the adjacent bunker 9 and ultimately out through the discharge vent 14. It is to be noted that the traps 10 are so positioned as to also permit a ready filling of the applied pans P with ice. It is to be mentioned at this time that with ice in the pans P means are provided for offsetting the heat of the sun which may penetrate the roof R.

Each of the openings 4 of one partition 3 is in alignment with a similar opening in the second partition 3 and fitting within such aligned openings 4 are the extremities of a conduit 19 herein disclosed as cylindrical in form. Rotatably mounted within one end portion of the conduit 19 is a fan 20, the shaft 21 of which being in driven connection with a shaft 22.

As particularly illustrated in Figure 2, the shaft 22 is common to the fans in both of the conduits 19 and this shaft 22 extends exteriorly of the body B, preferably through the front end wall 6 thereof, and is driven from a motor M preferably of an internal combustion type. This motor M constitutes a unit separate and distinct from the operating engine of the body B as comprised in a vehicle structure and, therefore, it is to be noted that the fans 20 can be rotated to advantage with the body B in transit or at a standstill or irrespective of the rate of travel the body B may be moved.

With the fans 20 in operation air is circulated through the chamber C as indicated by arrows in Figure 1 and this circulation is preferably through the chamber from the rear to the front. The air is drawn by the fans 20 through the ice in the forward bunker 9 and over the ice in the front pans P. The fans 20 also force the air through the conduits 19 over the ice in the rear pans P and down through the ice in the rear bunker 9 back into the lower portion of the chamber C. A circulation of air is maintained at a temperature sufficient to meet the requirements of practice.

The arrangement as illustrated in Figures 1 to 3 is intended primarily for the shipment of berries wherein it is necessary to maintain a relatively low temperature. It is also to be stated that the apparatus as disclosed in this embodiment of my invention is one wherein the desired lowering of the temperature within the chamber C is quickly attained and which is effectually maintained.

It has also been fully demonstrated in actual use that with the arrangement as embodied in this form of my invention the required poundage of ice is kept down to a minimum making it possible to haul a large load of berries. Furthermore, the refrigerating apparatus as just described is such as to require no pre-cooling. The berries can be loaded while warm and haulage started immediately upon completion of the loading. It is to be further stated that the efficiency of the apparatus as just described is particularly due to the fact that the load is exposed to three cooling surfaces, namely, the pans P and the bunkers 9 in addition to having cold air continuously drawn through the load. Practice has shown that in long shipment of berries or kindred foodstuffs this arrangement is essential.

In the shipment of beans and other commodities it is not required to use the pans P and, therefore, in connection with the shipment of beans or the like I employ the arrangement or assembly particularly illustrated in Figures 4 and 5. In this embodiment the pans P together with the props 15 16 and the members 15 are removed with, of course, the conduits 19 and the partitions 5' are continued up to the roof R'. A cylindrical conduit 19' bridges the space between the upper portions of the partitions 5' and extends therethrough for communication with the upper portions of the bunkers 9'. At one end portion of the conduit 19' and preferably the forward extremity is arranged a fan 20' for drawing the air through the forward bunker 9' and forcing the same rearwardly through the conduit 19' down through the rear bunker 9' and back into the chamber C'. The fan 20' is in driven connection with the shaft 22' which extends exteriorly of the body B' and is in driving connection with a motor M'.

In this embodiment of my invention I disclose the use of but a single conduit 19'. It is believed to be apparent, however, that two or more of such conduits may be used if desired.

From the foregoing description it is thought to be obvious that a refrigerating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A refrigerating apparatus comprising a closed chamber, partitions extending across the opposite end portions of the chamber to provide ice bunkers, the lower portions of said partitions being of an open structure to permit circulation of air through the bunkers to the intermediate portion of the chamber, said open structure of the partitions extending upwardly a material distance from the bottom of the chamber, the upper or remaining portions of the partitions being imperforate, a conduit mounted and entirely contained within the upper central portion of the chamber and in communication with the upper portions of the bunkers, said communication including horizontally disposed ice pans immediately adjacent the upper portions of the bunkers and below the horizontal plane of the conduit, and a fan mounted in the conduit closely adjacent to one of the bunkers for drawing air up through said bunker and forcing the same into and down through the second bunker.

2. A refrigerating apparatus comprising a closed chamber, partitions extending across the opposite end portions of the chamber to provide ice bunkers, the lower portions of said partitions being of an open structure to permit circulation of air through the bunkers to the intermediate portion of the chamber, said open structure of the partitions extending upwardly a material distance from the bottom of the chamber, the upper or remaining portions of the partitions being imperforate, a conduit mounted and entirely contained within in the upper central portion of the chamber and in communication with the upper portions of the bunkers, said communication including horizontally disposed ice pans immediately adjacent the upper portions of the bunkers and below the horizontal plane of the conduit, a fan mounted in the conduit closely adjacent to one of the bunkers for drawing air up through said bunker and forcing the same into and down through the second bunker, and a power unit for operating the fan supported exteriorly of the chamber.

3. A refrigerating apparatus comprising a portable chamber normally closed, partitions extending across the opposite end portions of the chamber to provide ice bunkers, the lower portions of said partitions being of an open structure to permit circulation of air through the bunkers to the intermediate portion of the chamber, said open structure of the partitions extending upwardly a material distance from the bottom of the chamber, the upper or remaining portions of the partitions being imperforate, a conduit mounted and entirely contained within in the upper central portion of the chamber and in communication with the upper portions of the bunkers, said communication including horizontally disposed ice pans immediately adjacent the upper portions of the bunkers and below the horizontal plane of the conduit, a fan mounted in the conduit closely adjacent to one of the bunkers for drawing air up through said bunker and forcing the same into and down through the second bunker, and a motor for operating the fan while the chamber is in transit or at a standstill.

4. A refrigerating apparatus comprising a normally closed chamber, spaced partitions extending across the central portion of the chamber, additional partitions extending across the opposite end portions of the chamber to provide ice bunkers, said second named partitions terminating below the top of the chamber, the lower portions of said second named partitions being of an open structure to permit circulation of air through the bunkers and into the central portion of the chamber, ice pans supported by and closing the space between the lower portions of the first partitions and the upper portions of the second partitions, a conduit connecting the space between the first partitions and opening through said partitions, and a fan mounted in the conduit for drawing air up through one of the bunkers and forcing the same into and down through the second bunker.

5. A refrigerating apparatus comprising a normally closed chamber, spaced partitions extending across the central portion of the chamber, additional partitions extending across the opposite end portions of the chamber to provide ice bunkers, said second named partitions terminating below the top of the chamber, the lower portions of said second named partitions being of an open structure to permit circulation of air through the bunkers and into the central portion of the chamber, ice pans supported by and closing the space between the lower portions of the first partitions and the upper portions of the second partitions, and conduits interposed between the first named partitions and opening therethrough, said conduits being spaced apart transversely of the chamber with one conduit at each side of the transverse center of the chamber, and a fan in each of the conduits for drawing air up through one of the bunkers and forcing the air into and down through the second bunker.

6. A refrigerating apparatus comprising a closed chamber, ice bunkers at the opposite end portions of said chamber, each of said bunkers having a wall, the lower portion of which is of an open structure to permit air to circulate therethrough and through the chamber, a conduit in the upper portion of the chamber, said conduit being in communication with both of the bunkers at the upper portions thereof, a fan structure entirely housed within the conduit for drawing air up through one of the bunkers and into and down through a second bunker, a shaft supported within the chamber and extending exteriorly thereof, an operative connection between the inner portion of the shaft and the fan for operating the fan upon rotation of the shaft, and means exteriorly of the chamber for rotating the shaft.

GUY LINDSEY.